(12) United States Patent
McCready et al.

(10) Patent No.: US 7,670,126 B2
(45) Date of Patent: Mar. 2, 2010

(54) VALVE FOR CONTROLLING AIR FLOW IN A MOLDED ARTICLE HOLDER

(75) Inventors: Derek Robertson McCready, Mississauga (CA); Scott Gregory Laughton, Toronto (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 859 days.

(21) Appl. No.: 11/432,882

(22) Filed: May 12, 2006

(65) Prior Publication Data

US 2007/0264385 A1    Nov. 15, 2007

(51) Int. Cl.
   *B29C 45/63* (2006.01)
(52) U.S. Cl. ............ 425/182; 137/15.22; 137/329.3; 425/437; 425/534
(58) Field of Classification Search .......... 425/182, 425/437, 446, 444, 348, 547, 534, 556; 264/348; 137/15.22, 249.21, 329.03, 329.3, 449
See application file for complete search history.

(56) References Cited

U.S. PATENT DOCUMENTS

| | | | | |
|---|---|---|---|---|
| 304,736 | A * | 9/1884 | Kelly | 137/247.17 |
| 859,399 | A * | 7/1907 | Martin | 137/329.03 |
| 1,435,029 | A * | 11/1922 | Stewart | 137/329.03 |
| 3,906,986 | A * | 9/1975 | Zurit et al. | 137/212 |
| 3,918,679 | A | 11/1975 | Silvana | |
| 4,162,974 | A | 7/1979 | Pernic | |
| 4,243,067 | A * | 1/1981 | Rubey | 137/329.03 |
| 4,508,369 | A | 4/1985 | Mode | |
| 5,374,084 | A | 12/1994 | Potokar | |
| 5,447,426 | A | 9/1995 | Gessner et al. | |
| 5,462,313 | A | 10/1995 | Rea et al. | |
| 5,549,130 | A * | 8/1996 | Schuster | 137/39 |
| 5,702,734 | A | 12/1997 | Hartman et al. | |
| 5,893,707 | A | 4/1999 | Simmons et al. | |
| 6,161,579 | A | 12/2000 | Vulliet | |
| 6,171,541 | B1 | 1/2001 | Neter et al. | |
| 6,299,413 | B1 * | 10/2001 | Stahlman et al. | 417/53 |
| 6,391,244 | B1 | 5/2002 | Chen | |
| 6,988,747 | B2 | 1/2006 | Allen et al. | |
| 2003/0024571 | A1 | 2/2003 | Simmons et al. | |
| 2003/0090110 | A1 | 5/2003 | Choi | |
| 2004/0247734 | A1 * | 12/2004 | Unterlander et al. | 425/528 |
| 2006/0204605 | A1 * | 9/2006 | Neter et al. | 425/526 |
| 2006/0204607 | A1 * | 9/2006 | Neter et al. | 425/547 |
| 2006/0204608 | A1 * | 9/2006 | Neter et al. | 425/547 |

FOREIGN PATENT DOCUMENTS

| | | |
|---|---|---|
| DE | 102005012298 A1 | 11/2005 |
| EP | 1123189 B1 | 8/2001 |
| EP | 1123189 B1 | 1/2003 |

* cited by examiner

*Primary Examiner*—Yogendra Gupta
*Assistant Examiner*—Emmanuel S Luk
(74) *Attorney, Agent, or Firm*—Husky Intellectual Property Services

(57) ABSTRACT

Disclosed, amongst other things, is: (i) a valve (220, 320, 420, 520, 620) for controlling air flow in an air pressure channel (354, 454) of a molded article holder (50, 150, 250, 350, 450); (ii) a molded article holder (350, 450) co-operable with the valve (220, 320, 420, 520, 620); and (iii) a post-mold holding device (315, 415) including the molded article holder (350, 450) and valve (220, 320, 420, 520, 620).

37 Claims, 11 Drawing Sheets

VALVE FOR CONTROLLING AIR FLOW IN A MOLDED ARTICLE HOLDER

TECHNICAL FIELD

The present invention generally relates to, but is not limited to, molding systems, and more specifically the present invention relates to, but is not limited to, (i) a molded article holder; (ii) a retainer for a molded article holder; and (iii) an insert for a molded article holder, amongst other things.

BACKGROUND

Some injection molded parts, for example plastic preforms of the variety that are for blow molding into beverage bottles, require extended cooling periods to solidify into substantially defect-free molded parts. To the extent that the cooling of the molded part can be effected outside of the injection mold by one or more post-mold holding devices then the productivity of the injection mold may be increased (i.e. lower cycle time). A variety of such post-mold holding devices, and related methods, are known and have proven effective at the optimization of the injection molding machine cycle time.

In a typical injection molding system, such as the system 10 depicted with reference to FIG. 1A, and as generally described in commonly assigned U.S. Pat. No. 6,171,541 (Inventor: NETER, Witold, et al.; Published: 9 Jan. 2001), just-molded, and hence partially cooled, molded articles 2 are ejected from the mold half 8, when the mold halves 8, 9 are spaced apart, and into molded article holders 50 (i.e. commonly known as a cooling tube, a take-off tube, or a cooling pipe, amongst others). The holders 50 are arranged on a molded article holding device 15 (i.e. commonly known as an end-of-arm-tool, carrier plate assembly, removal device, post-cooling apparatus, amongst others), the holding device 15 arranged to be cyclically positioned between an in-mold position, between the mold halves 8, 9, to receive the molded articles 2, and an out-board position, as depicted, to allow the mold halves 8, 9 to close and begin another molding cycle. Preferably, the molded articles 2 are held in the holders 50 until the molded articles 2 have cooled sufficiently that they may be ejected without risk of further deformation. While held in the holders 50, the cooling of the molded articles 2 may be assisted by the use of cooling/extraction pins 14 expelling a cooling fluid onto exposed portions of the molded articles 2. The cooling/extraction pins 14 are arranged on another molded article holding device 12 (i.e. commonly known as a COOLJET, a trademark of Husky Injection Molding Systems Ltd.), the holding device 12 arranged to be cyclically positioned between a cooling position, with the cooling/extraction pins 14 positioned adjacent the exposed portion of the molded articles 2, and an out-board position, as depicted. It is also known to use the cooling/extraction pins 14 to extract the molded articles 2 from the holders 50. The transfer of the molded articles between the holders 50 and the cooling/extraction pins 14 has been effected by various means. The steps involved in the typical transfer process include: (i) positioning the cooling/extraction pins 14 within a suitable region of the molded articles 2; (ii) connecting the cooling/extraction pins 14 to a negative pressure source, thereby creating a vacuum within the region of the molded articles 2; (iii) forcibly ejecting the molded articles 2 from the holders 50; once released from the holders 50, the molded articles 2 are captured by the cooling/extraction pins 14, under the applied vacuum, and the molded articles are extracted with the re-positioning of the holding device 12. The molded articles 2, extracted with the holding device 12, may then be re-handled and then ejected by the application of a positive fluid pressure through the cooling/extraction pins 14.

It is known to practice the step of forcibly ejecting the molded articles 2 from the holding device 15 by means of direct mechanical action, not shown. For example, commonly assigned U.S. Pat. No. 5,447,426 (Inventor: GESSNER, Dieter, et al.; Published: 5 Sep. 1995) describes a mechanically-actuated rail that bears against an outwardly extending portion of the molded articles, thereby forcing the molded articles from the holders. Such a means has proven to be a very reliable solution for ejecting the molded articles. However, not all molded articles have the requisite outwardly extending portion. In addition, such mechanical-based ejection systems do add significant weight to the holding device that requires larger driving motors to achieve the fast cycling speeds demanded by present productivity standards.

It has been known to configure the holder 50, as depicted with reference to FIG. 1B, to include a generally non-mechanical means for molded article ejection. In particular, the holder 50 includes a pressure channel 54 that is connectable to an air pressure source 18 via channel 18', provided in a plate body 16. The pressure source 18 is configured to selectively provide overpressure or negative pressure through the pressure channel 54 to a cavity 52 defined along a tube 60 and tube insert 70. The pressure channel 54 includes a first portion, not shown, extending through the base of the tube, the first portion connecting a second portion, shown extending through a portion of the insert 70, with the pressure source 18'. The steps involved in the typical transfer process include: (i) configuring a suction air flow through the pressure channel 54 from the cavity 52 to the pressure source 18, the pressure source 18 configured as a negative pressure source, for effecting a transfer of the molded article 2 from the mold half 8 to the cavity 52; (ii) continuing the application of negative pressure through the pressure channel 54, to hold the molded article 2 in the cavity 52 of the holder 50, as the molded article 2 is cooled (by heat conduction through the tube 60 to a coolant circulating in the coolant channel 62 configured around the tube 60, and enclosed by a tube sleeve 64, the coolant channel 62 connectable to a coolant source 17, 17' in the plate body 16); (iii) configuring the pressure source 18 to provide overpressure to the pressure channel 54, and thereby pressurize the cavity 52 and effect the ejection of the molded article 2 therefrom. Many factors affect the ejection of the molded article from the tube 2, including the geometry of the molded article 2 (e.g. a shallow draft angle on the outside of the molded article can cause the preform to stick in the tube). Suffice it to say, that not all of the molded articles 2 that are desired to be ejected simultaneously will release with common ease, and hence some molded articles may release earlier than others. Under such circumstances, when some subset of a total number of the molded articles are initially released, the cavity 52 of the corresponding holders 50 are at ambient pressure and hence the unchecked air flow from the pressure channel 54 is not being directed to the remaining holders 50 having molded articles 2 remaining therein. Accordingly, with the air flow losses associated with the venting holders 50, there may be insufficient air pressure remaining to dislodge the molded articles 2 that are more resistant to ejection in a timely manner, if at all.

FIG. 1B also shows that a fastener 72 is used to connect the holder 50 to the plate body 16, the holder configured to accommodate the fastener 72 along a passageway configured along a longitudinal axis of the holder 50. The foregoing arrangement while providing a readily serviceable connection, the technician merely needs to use a key through the pressure channel 54 to modify the connection, does have a significant drawback in that portions of the pressure channel 54, not shown, need to be off the longitudinal axis of the holder (namely the portion extending through the base of the tube 60). Accordingly, beyond the added complexity of manufacture, the foregoing arrangement does also suffer from a higher pressure drop between the pressure source 18 and the cavity 52.

Another example of a non-mechanical holder 150 is shown with reference to FIG. 2. The holder 150 is configured in much the same way as holder 50.

Wherever possible, similar features of the embodiments of the prior art and of the present invention have been given similar reference numbers and their descriptions have not been repeated.

The main difference between the two is that the holder 150 includes a checkable pressure channel 154, and an auxiliary pressure channel 136. The valve checkable pressure channel 154 includes a valve element 126 that is trapped between, at all times, a device portal 128 at the top of a portion of the pressure channel 154 that defines a valve chamber 124, and a plenum portal 130 configured at the base of the valve chamber 124. A valve seat 132 is configured adjacent the device portal 128 that cooperates with the valve element 126 for isolating the device and plenum portals 128, 130 when an overpressure is applied from the pressure source 118, 118' to the pressure channel 154. The much narrower auxiliary pressure channel 136, relative to the pressure channel 154, is also connected to the pressure source 118, 118', but without provision for a checkable valve. In addition, the insert 170 is configured to cooperate with the tube 160 and the fastener 72 such that it is movable along the longitudinal axis of the tube 160 to assist in supporting the molded article 2 as it is being ejected. The steps involved in the typical transfer process include: (i) configuring a suction air flow through both the pressure channel 154 (the valve element 126 resting in a configuration with respect to the plenum portal 130 such that the valve chamber maintains a fluid connection between the device and plenum portals 128, 130) and the auxiliary pressure channel 136, from the cavity 152 to the pressure source 118, the pressure source 118 configured as a negative pressure source, for affecting a transfer of the molded article 2 from the mold half 8 to the cavity 152; (ii) continuing the application of negative pressure through the pressure channels 154, 136, to hold the molded article 2 in the cavity 152 of the holder 150, as the molded article 2 is cooled; (iii) configuring the pressure source 118 to provide overpressure to the pressure channels 154, 136, the valve element 126 moving to cooperate with the valve seat 132, isolating the device portal 128 from the pressure source 118, as soon as air begins to flow into the cavity 152, the air flow through the auxiliary pressure channel 136 continuing unchecked (the auxiliary channel includes an outlet nozzle 138, which may assist in moving the insert 170 forward during ejection). The foregoing arrangement provides for reduced air pressure losses from empty holders 150, relative to the holder 50, the losses mitigated by the pressure losses through the relatively narrow auxiliary channel. Nonetheless, the auxiliary channel 136 and portions 154A and 154B of the pressure channel 154 are off-axis relative to a common connecting portion 154C of the pressure channel 154, with associated pressure losses which can affect the efficacy of the transfer from the mold 8 into the holder 150. Perhaps of more significance, is the pressure losses associated with the circuitous route in which the air must flow around the valve element 126 when effecting a suction air flow through the valve chamber 124. In particular, the device and plenum portals 128, 130 are arranged on opposite sides of the valve element 126 at all times thereby requiring the air to flow past the rather narrow gaps between the valve element and the valve chamber 124 and with associated pressure losses.

European Patent 1 123 189 B1 (Inventor: WEINMANN, Robert, et al.; Published: 29 Jan. 2003) provides yet another example of a non-mechanical variety of molded article holder that includes a pressure-biased valve check pin for controlling air flow between a cavity, defined in the holder, with a pressure source.

SUMMARY

According to a first aspect of the present invention, there is provided a valve including a valve for controlling air flow in a molded article holder. The valve comprises a body for defining a valve chamber for movably receiving a valve element. The valve chamber includes a device portal and a plenum portal. The device portal is spaced apart from the plenum portal in the direction of travel of the valve element. With a lower air pressure at the plenum portal than the device portal, the valve element movable to an open position behind the device and plenum portals at least in part. With a higher air pressure at the plenum portal than the device portal, the valve element movable to a blocking position between the device and plenum portals for isolating the device portal from the plenum portal.

According to a second aspect of the present invention, there is provided a molded article holder. The molded article holder comprises a body defining a cavity for receiving the molded article, a pressure channel in the body extending into the cavity for affecting a pressure induced mobility control of the molded article with respect to the cavity. The molded article holder also including a valve for controlling air flow in the pressure channel. The valve comprises a body for defining a valve chamber for movably receiving a valve element. The valve chamber includes a device portal and a plenum portal. The device portal is spaced apart from the plenum portal in the direction of travel of the valve element. With a lower air pressure at the plenum portal than the device portal, the valve element movable to an open position behind the device and plenum portals at least in part. With a higher air pressure at the plenum portal than the device portal, the valve element movable to a blocking position between the device and plenum portals for isolating the device portal from the plenum portal.

According to a third aspect of the present invention, there is provided a post-mold holding device having a molded article holder. The molded article holder comprises a body defining a cavity for receiving the molded article, a pressure channel in the body extending into the cavity for affecting a pressure induced mobility control of the molded article with respect to the cavity. The molded article holder also including a valve for controlling air flow in the pressure channel. The valve comprises a body for defining a valve chamber for movably receiving a valve element. The valve chamber includes a device portal and a plenum portal. The device portal is spaced apart from the plenum portal in the direction of travel of the valve element. With a lower air pressure at the plenum portal than the device portal, the valve element movable to an open position behind the device and plenum portals at least in part. With a higher air pressure at the plenum portal than the device portal, the valve element movable to a blocking position between the device and plenum portals for isolating the device portal from the plenum portal.

A technical effect, amongst others, of the aspects of the present invention includes a low pressure drop across the check valve that provides for improved suction air flow through a molded article holder for affecting a more reliable transfer of the molded article into the holder.

A technical effect, amongst others, of the aspects of the present invention includes compressed air conservation for a more reliable ejection of molded article from the molded article holder.

A technical effect, amongst others, of the aspects of the present invention include a valve that is configured for retrofit for use with existing molded article holders.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

The drawings are not necessarily to scale and are may be illustrated by phantom lines, diagrammatic representations and fragmentary views. In certain instances, details that are not necessary for an understanding of the exemplary embodiments or that render other details difficult to perceive may have been omitted.

DETAILED DESCRIPTION OF THE EXEMPLARY EMBODIMENTS

Figure 5:
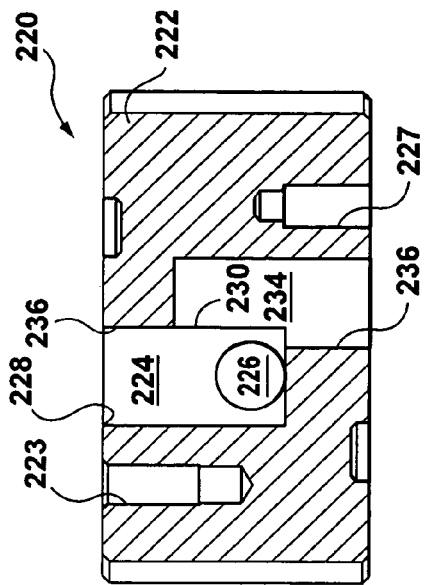
FIG. 5 is a section view of the valve of FIG. 3 taken along the section lines 5-5 as shown in FIG. 4.
Figure 6:
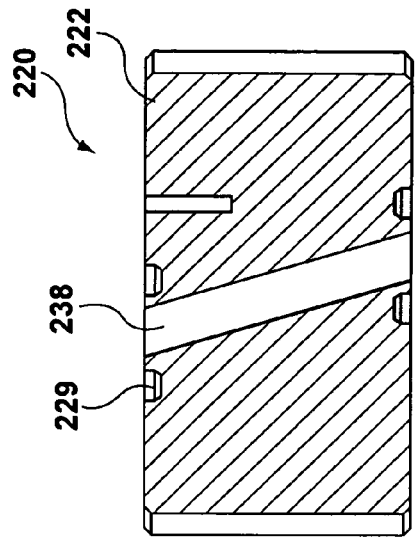
FIG. 6 is a section view of the valve of FIG. 3 taken along the section lines 6-6 as shown in FIG. 4.
Figure 4:
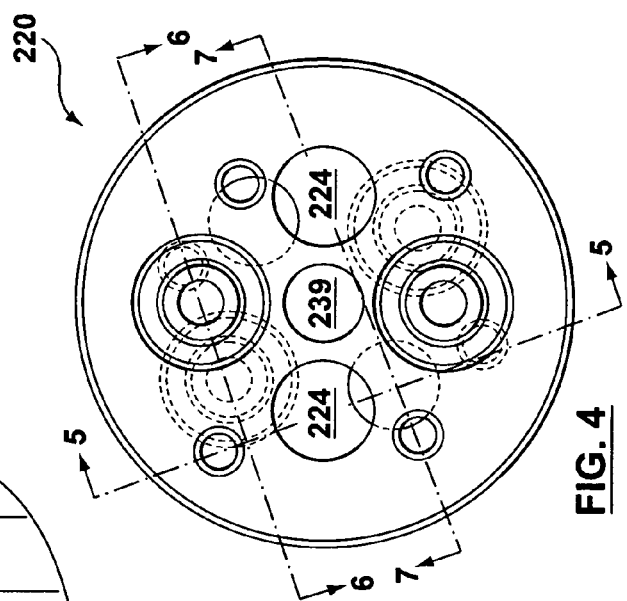
FIG. 4 is a top elevation view of the valve of FIG. 3.
Figure 3:
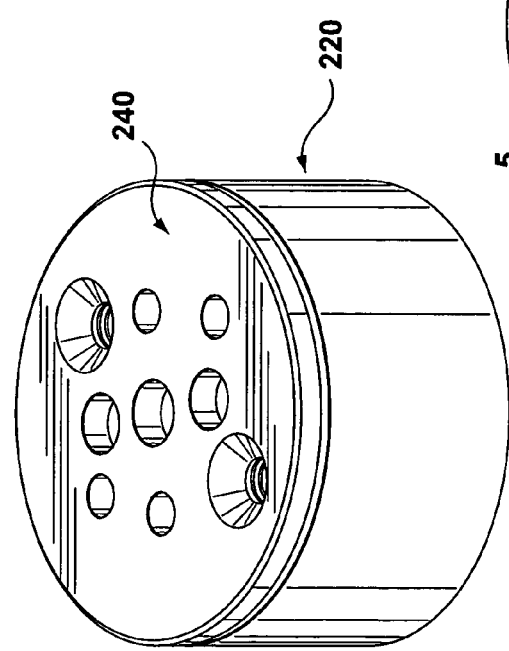
FIG. 3 is an isometric view of a valve and valve cap in accordance with a presently preferred embodiment of the present invention.
Figure 7:
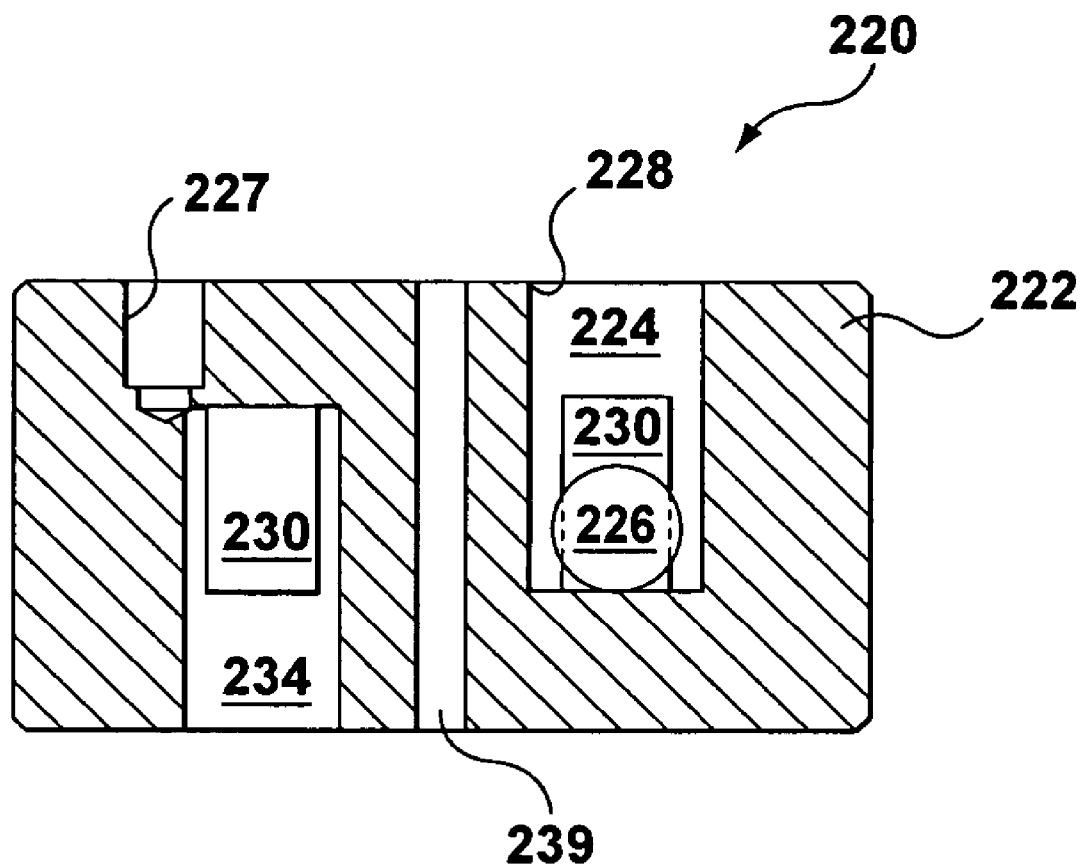
FIG. 7 is a section view of the valve of FIG. 3 taken along the section lines 7-7 as shown in FIG. 4.

FIG. 3 is an isometric representation of the valve 220, in accordance with a presently preferred embodiment of the present invention, for controlling air flow in the pressure channel 54, 154 of the molded article holder 50, 150. With reference to the section views FIGS. 5, 6, and 7, taken through the valve 220 along the section lines indicated in FIG. 4, it can be seen that the valve 220 includes a body 222 defining a valve chamber 224 for movably receiving a valve element 226. The valve chamber 224 includes a device portal 228 and a plenum portal 230, the device portal 228 being spaced apart from the plenum portal 230, in the direction of travel of the valve element. The plenum portal 230 is connectable to a pressure source 18, 118. The device portal 228 is connectable to the pressure channel 54, 154 of the holder 54, 154. With a lower air pressure at the plenum portal 230 than the device portal 228 the valve element 226 is urged to move to an open position behind the device and plenum portals 228, 230, at least in part, thereby opening a fluid connection between the portals 228, 230, via the valve chamber 224. With a higher air pressure at the plenum portal 230 than the device portal 228, the valve element 226 is urged to move to a blocking position between the device and plenum portals 228, 230 for isolating the device portal 228 from the plenum portal 230.

A technical effect of moving the valve element behind the device and plenum portals 228, 230, at least in part, is that a fluid connection is configured therebetween having a relatively low pressure drop.

Preferably, the plenum portal 230 is configured to be longer than the valve element 226, in the direction of travel of the valve element 226, and the plenum portal 230 configured to retain the valve element 226 in the valve chamber 224, at least in part. More preferably, the plenum portal 230 is at least twice as long as the valve element 226 in the direction of travel of the valve element 226. More preferably still, in the open position, a cross-sectional area of the plenum portal 230 in front of the valve element 226 is to be configured to be substantially the same, or greater, than a cross-sectional area of the device portal 228.

Preferably, the valve element 226, in the blocking position, is sealingly co-operable with a valve seat, not shown. More particularly, the valve seat, not shown, and valve element 226 are preferably configured to have a complementary configuration. The valve seat may be configured, for example, in the valve chamber 224 of the valve body 222, on the bottom of the molded article holder 50, 150, or on another body altogether. The valve element 226 is preferably a light weight ball bearing made of steel. Of course, the valve element 226 may have other suitable shapes, for example, as a cylindrical member. The valve element 226 may also be made from other materials, for example, such as polymers (e.g. Nylon).

It is presently preferred to configure the valve seat, not shown, on a face of a valve cap 240, as shown with reference to FIG. 3, in use, the valve cap 240 is arranged between the valve 220 and the holder 50, 150. The valve cap 240 is shown as including a set of complementary connecting passageways corresponding to those of the valve 220 and holder 50, 150. In particular, there are passageways for connecting the pressure channel 54, 154 of the molded article holder 50, 150, with the device portal 228 of the valve 220. There are also passageways for connecting the coolant channels 62, 162 of the molded article holder 50, 150, with a coolant channel 238 in the valve 220, the coolant channel 238 itself connectable to the coolant source 17' in the plate body 16, 116 of the post-mold holding device 15, 115 (also shown configured in the top and bottom faces of the valve body 222 surrounding the coolant channels 238 are seats 229 for accommodating o-ring seals). The remaining miscellaneous passageways accommodate various fasteners, dowels, and the like, for interconnecting the holder with the plate body 16, 116, and fastening the valve cap 240 on the valve 220 for retaining the valve element 226 in the valve chamber 224.

Preferably, the valve chamber 224 is fluidly connected to a plenum 234 through the plenum portal. The plenum 234 is preferably configured in the valve body 222. Alternatively, for example, the plenum may be configured in a separate body, such as in the plate body 16, 116, that is co-operable with the valve body 222. Preferably, a cross-sectional area of the plenum 234 and the valve chamber 224 are substantially the same. More preferably, the plenum portal 230 is defined by overlap-connected sidewalls 236 of the valve chamber 224 and plenum 234. More preferably, the valve chamber 224 and plenum 234 are provided by substantially straight channels that are formed in the valve body 222 in a staggered arrangement, both radially and longitudinally, and that the channels generally parallel. The foregoing channel arrangement may be formed by drilling the staggered channels through opposite sides of the valve body 222. The presently preferred plenum portal 230 therefore extends through the sidewall 236 of the valve chamber 224, in the direction of travel of the valve element 226, from a base of the valve chamber 224 to about twice a length of the valve element 226. Preferably, the valve element 226 is arranged in the valve chamber 224 such that a portion of the valve element 226 projects into the plenum 234 as the valve element 226 moves between the open position and a valve blocking position.

Figure 1A:
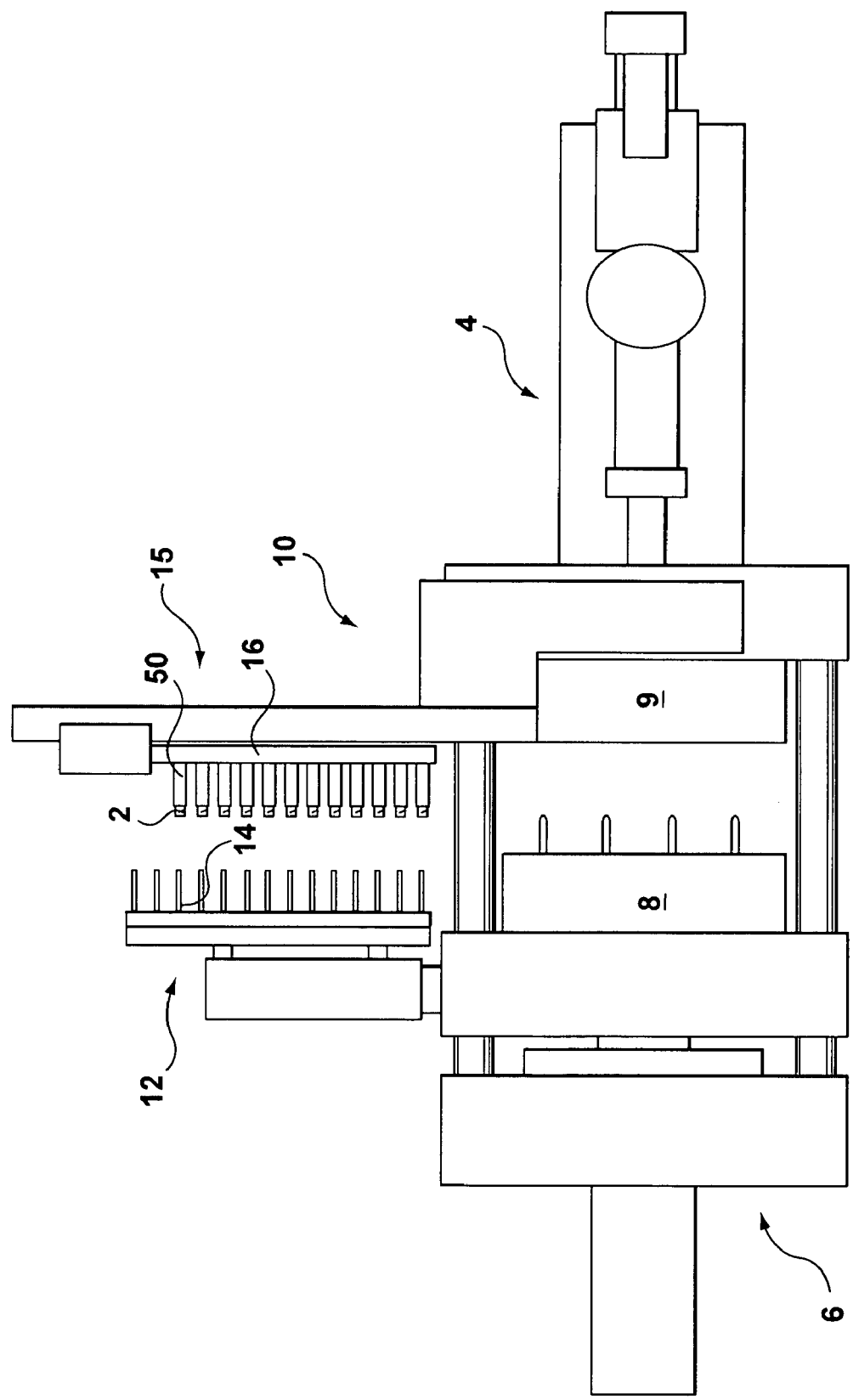
FIG. 1A is a top elevation view of a known injection molding system.
Figure 1B:
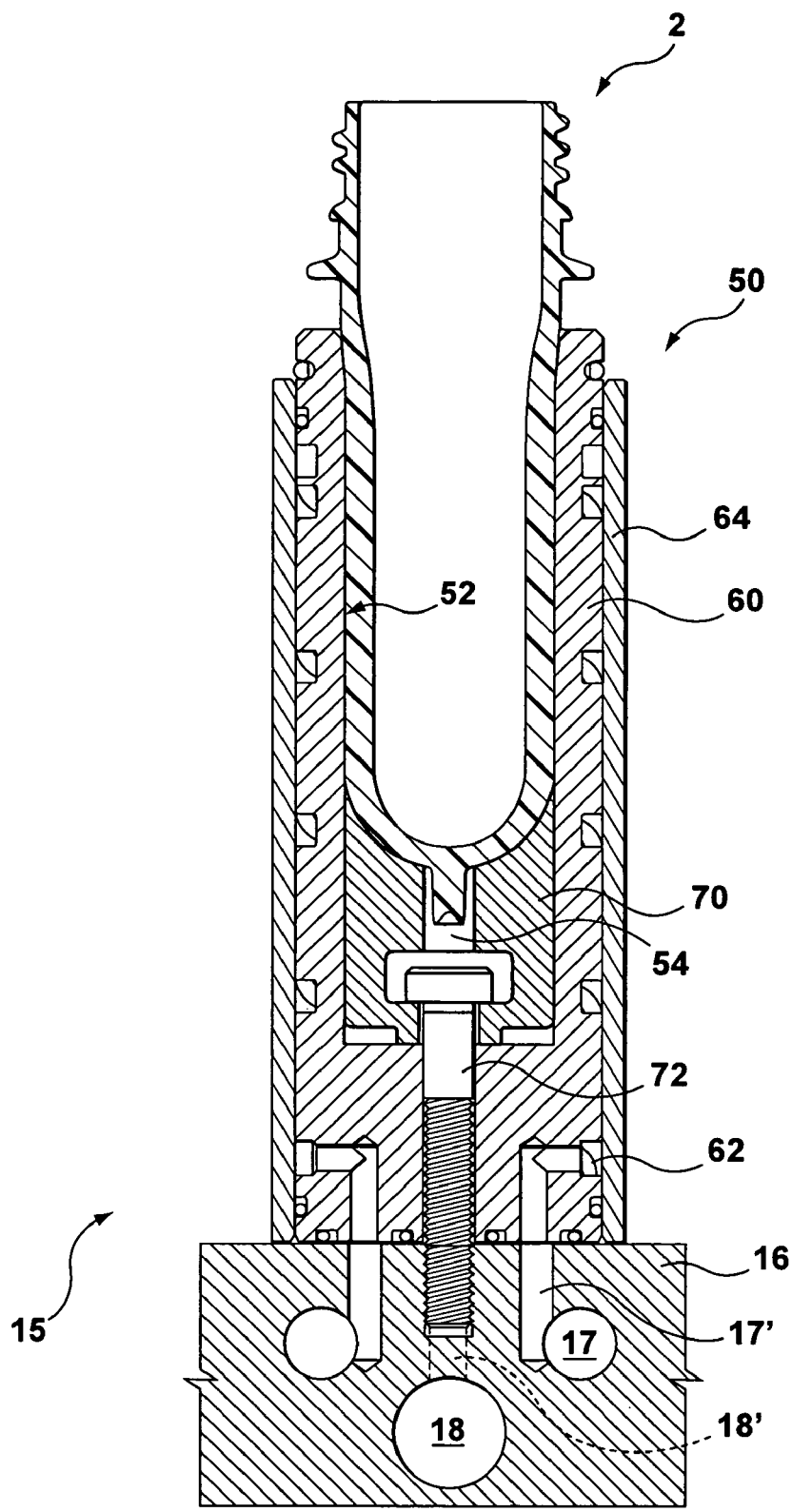
FIG. 1B is a section view through a post-mold holding device depicted in the injection molding system of FIG. 1A.
Figure 2:
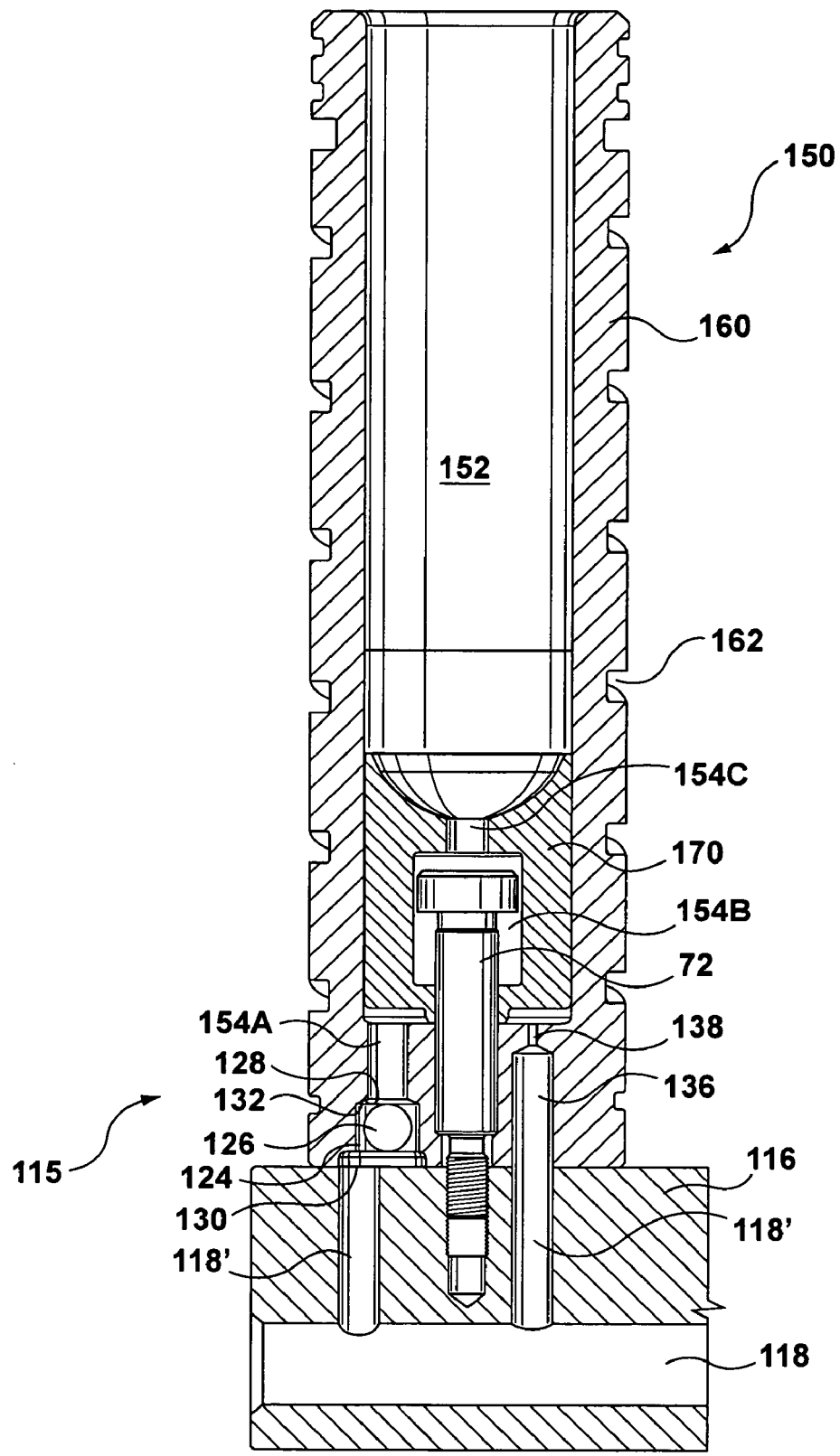
FIG. 2 is a section view through another example of a known post-mold holding device.

With reference to FIGS. 8A through 8D, a sequence of steps for a post-mold holding, and cooling, of a molded article 2 are depicted using a post-mold holding device 315 in accordance with a first alternative embodiment of the present invention in conjunction with the injection molding system 10, reference FIG. 1A, and as described hereinbefore. The post-mold holding device 315 includes a molded article holder 350 mounted on a plate body 316. The molded article holder 350 is similar to holder 50 described hereinbefore. An exception to the foregoing is in that a retainer 380 replaces the fastener 72. The retainer 380 is provided by a generally cylindrically-shaped retainer body 381 that defines a portion of a pressure channel 354A, extending through the retainer body 381 along its longitudinal axis, for connecting another portion of the pressure channel 354B, configured in the insert 370, with a device portal 328 of a valve 320. The valve 320 is configured in the plate body 316 consistent with the valve 220 described hereinbefore. Preferably, a valve seat 332 of the valve 320 is configured at the base of the retainer 380 around the opening of the pressure channel portion 354A. Advantageously, the valve seat 332 can be inexpensively replaced, when worn, by simply replacing the relatively inexpensive retainer 380. Preferably, the retainer 380 is made from a durable grade of steel. The retainer 380 also preferably includes a tooling interface 386 configured along a top portion of the pressure channel portion 354A. The tooling interface 386 is accessible, by a key, through the pressure channel 354 for manipulating a threaded connection provided along a recess in the plate body 316 and a lower outer portion of the retainer 380. The retainer body 381 also defines a first and second flange 388, 389 for trapping the insert 370 in the tube 360.

Figure 8A:
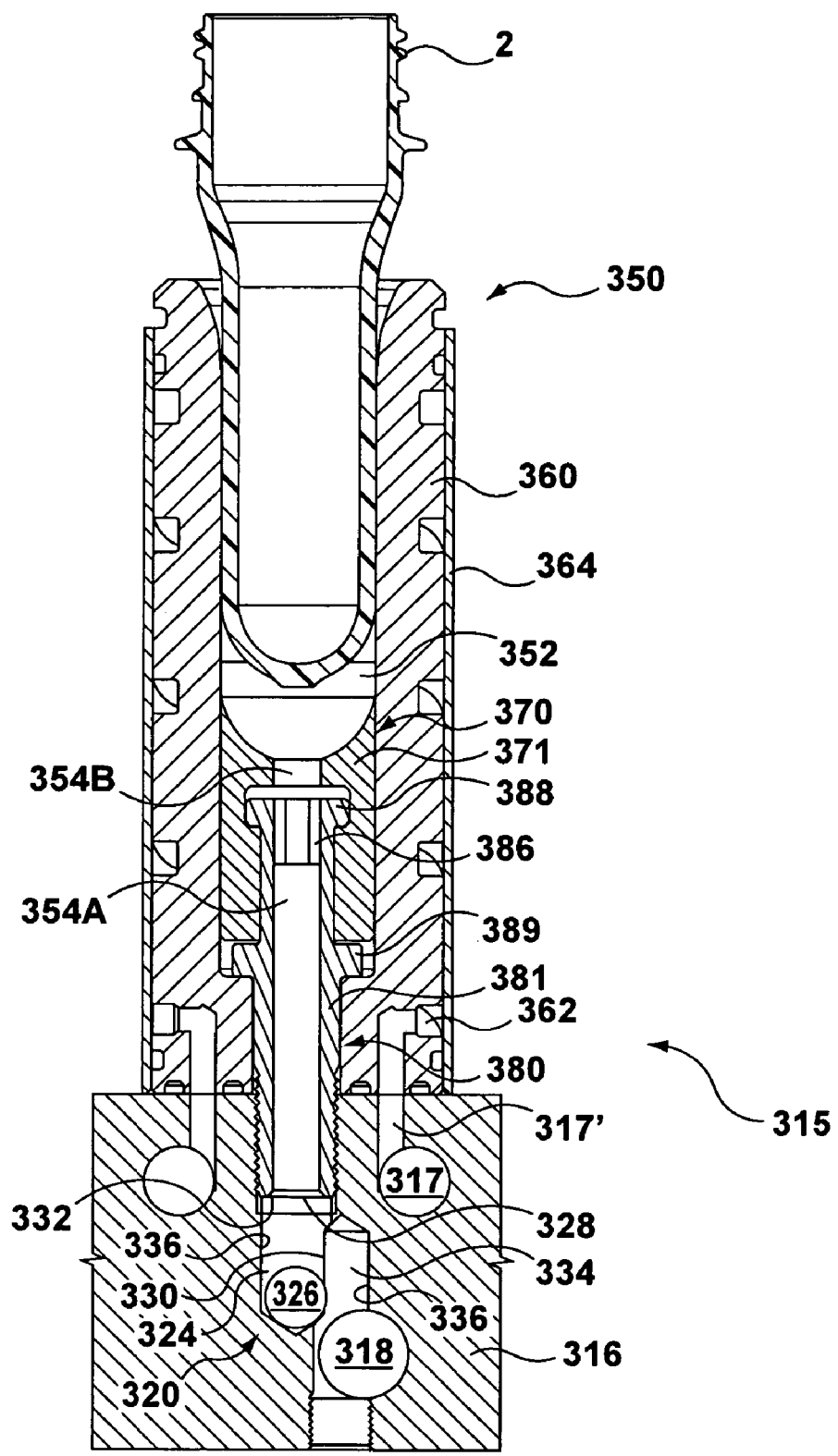
FIG. 8A is a section view of a post-mold holding device in accordance with a first alternative embodiment of the present invention during a step of transfer of the molded article into a holder.

FIG. 8A shows the molded article 2 as it is being transferred into the cavity 352 of the molded article holder 350 from the mold, not shown. The pressure source 318 is configured to provide negative pressure to the plenum 334 that acts on the valve element 326, through the plenum portal 330, to urge the valve element into an open position, as depicted, that is behind both the device and plenum portals 328, 330, at least in part. The valve 320, with the valve member 326 in the open position, supports a suction air flow between the cavity 352 and the pressure source 318 for sucking the molded article 2 into the holder 350.

Figure 8B:
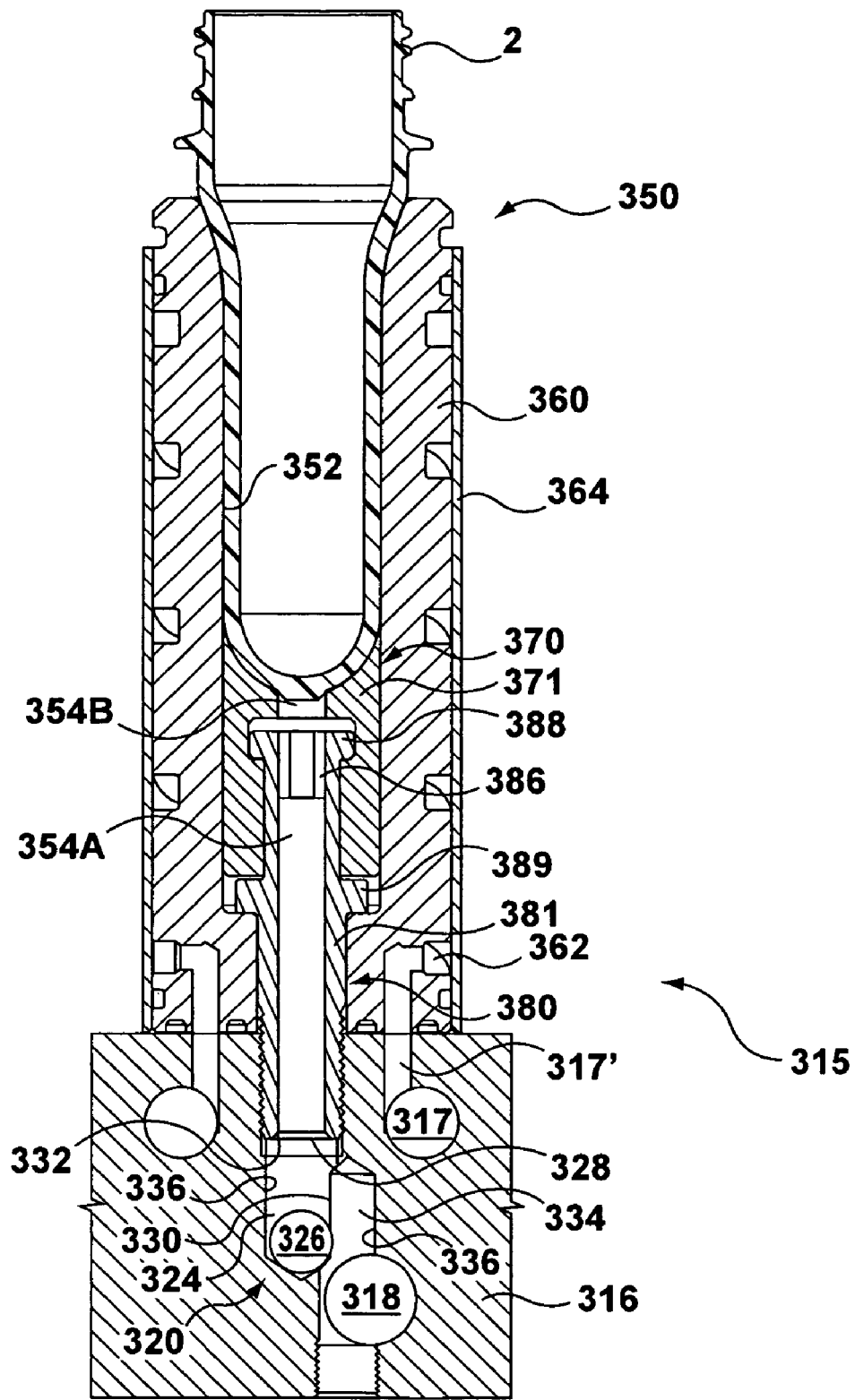
FIG. 8B is a section view of the post-mold holding device of FIG. 8A during a step of holding the molded article in the holder.

FIG. 8B shows the molded article 2 as it is being held in the cavity 352 of the molded article holder 350. The pressure source 318 is preferably configured to maintain negative pressure to the plenum 334, to keep the shrinking molded article 2 (from the effects of cooling) firmly retained in the molded article holder 350.

Figure 8C:
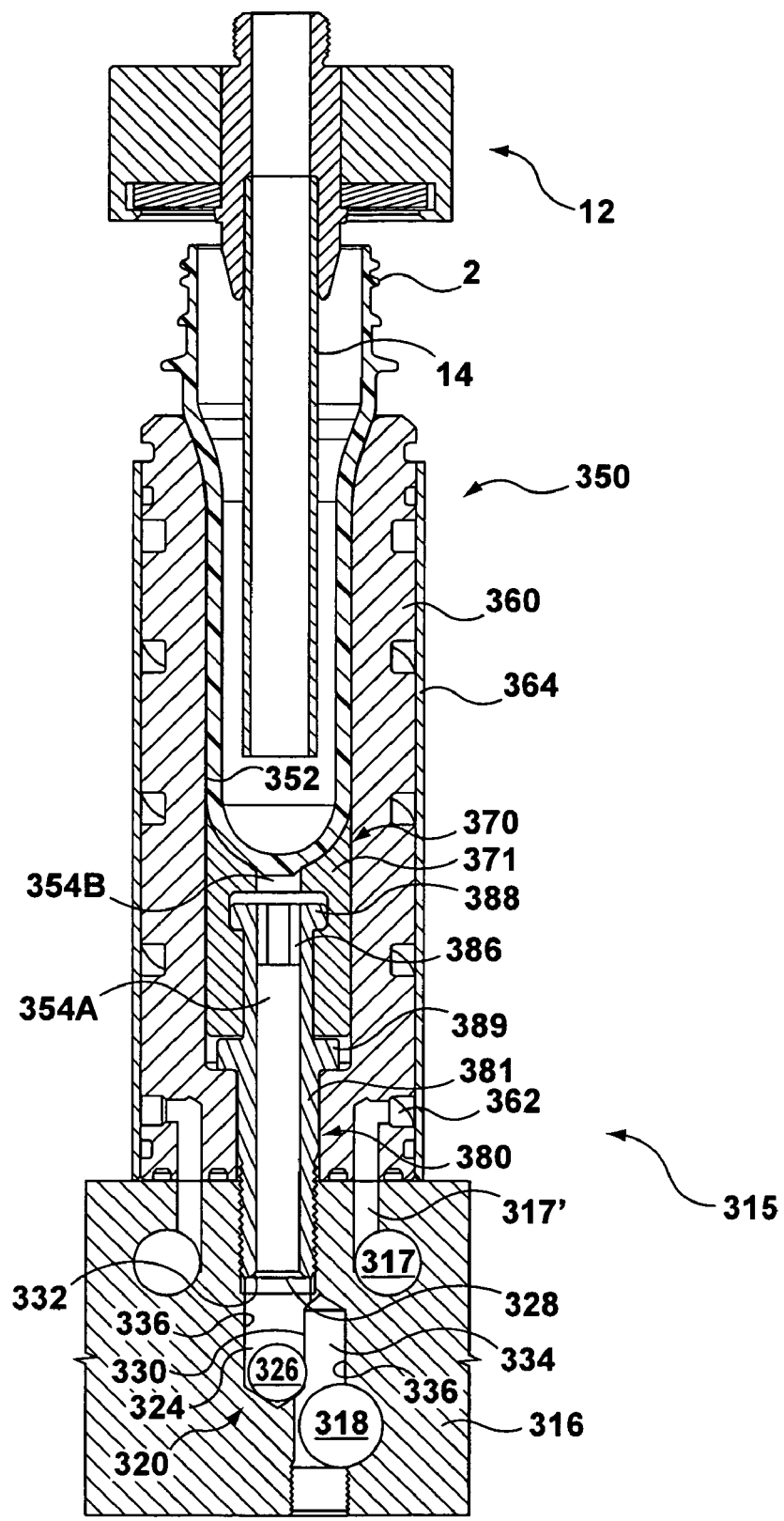
FIG. 8C is a section view of the post-mold holding device of FIG. 8A during a step of transfer of the molded article to another post-mold holding device at a moment prior to the ejection of the molded article from the holder.

FIG. 8C shows the molded article 2 during a step of transfer of the molded article 2 from the post-mold holding device 315 to another post-mold holding device 12. In particular, the valve element 326 is shown in the open position, behind the portals 328, 330, at an instant after the pressure source 318 is reconfigured to provide overpressure to the plenum 334, and before the molded article 2 is dislodged from the cavity 352 of the molded article holder 350. A cooling/extraction pin 14, of the post-mold holding device 12 is positioned in the molded article 2 waiting to receive the molded article 2.

Figure 8D:
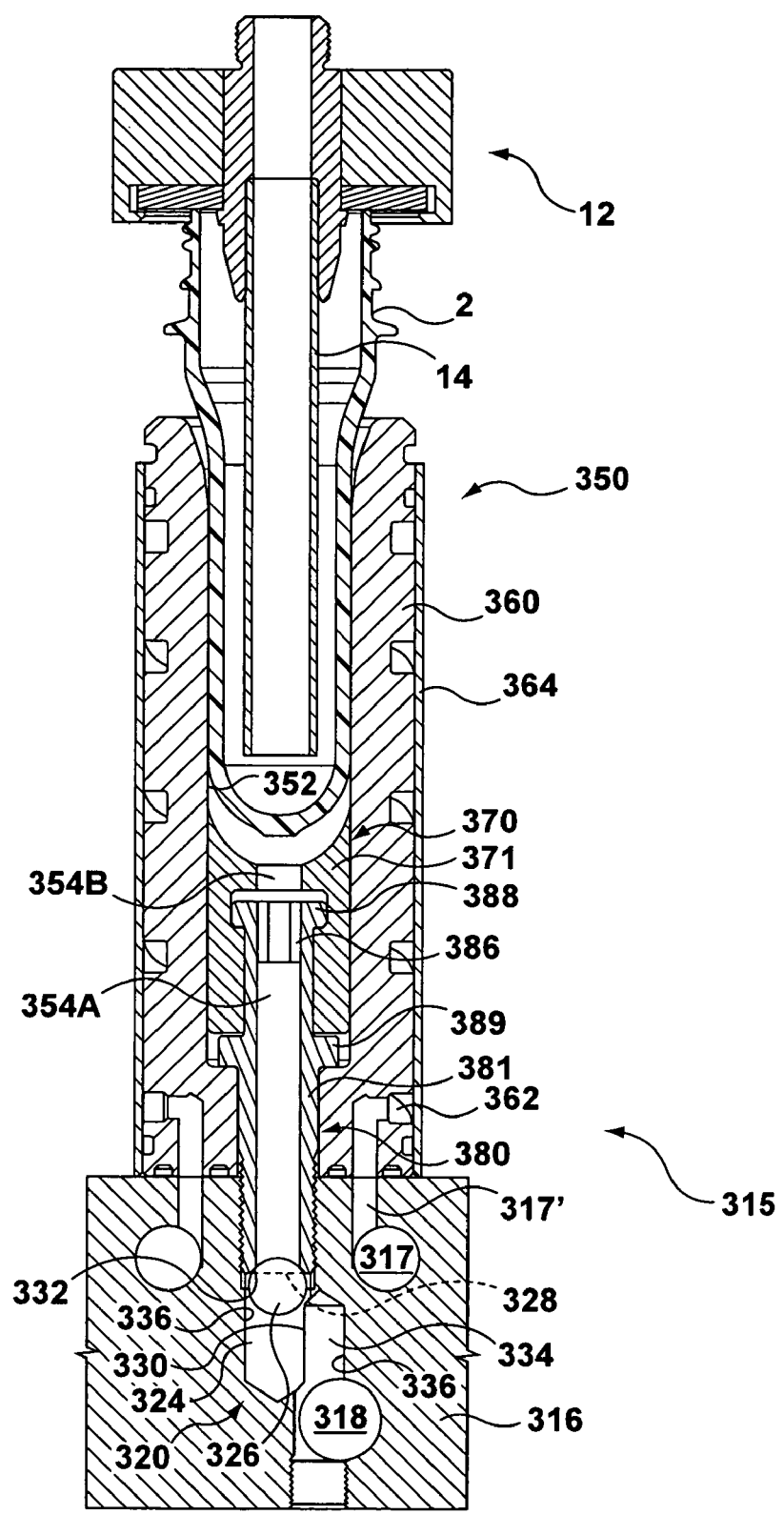
FIG. 8D is a section view of the post-mold holding device of FIG. 8A during a step of transfer of the molded article to another post-mold holding device at a moment after the ejection of the molded article from the holder.

FIG. 8D shows the molded article 2 during a step of extraction of the molded article 2, having been released from the post-mold holding device 315, by the post-mold holding device 12. In particular, the valve element 326 is shown in the blocking position, between the portals 328, 330, and sealed against the valve seat 332, and hence the device portal 328 is isolated from the overpressure.

Figures 9, 10:
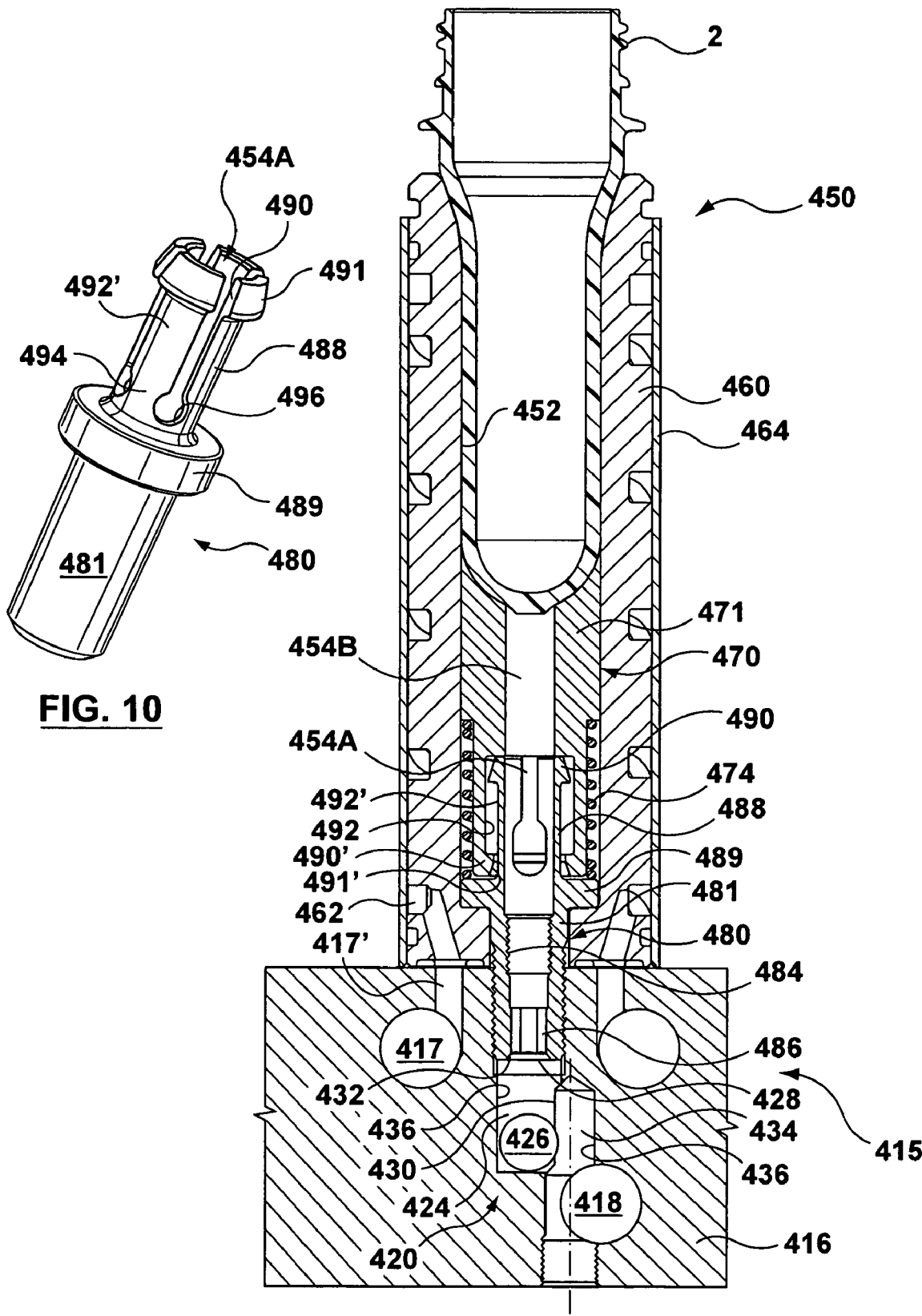
FIG. 9 is a section view of a post-mold holding device in accordance with a second alternative embodiment of the present invention.
FIG. 10 is an isometric view of a retainer of a molded article holder in accordance with the post-mold holding device of FIG. 9.

With reference to FIGS. 9 and 10 a post-mold holding device 415 in accordance with a second alternative embodiment of the present invention is depicted. The post-mold holding device 415 includes a molded article holder 450 mounted on a plate body 416. The molded article holder 450 and plate body 416, including valve 420, are similar to the holder 350 and plate body 315 as described hereinbefore. An exception to the foregoing is with the configuration and interplay of the retainer 480 and insert 470. In particular, the molded article holder 450 comprises an insert 470, a tube 460 co-operable with the insert 470 for defining a cavity 452 for receiving a molded article 2, and a retainer 480 co-operable with the tube 460 for connecting the tube 460 to the post-mold holding device 415. The retainer 480 is snap-engagable with the insert 470.

Preferably, the insert 470 and the retainer 480 include complementary tongue and groove members 490, 492 linked thereto. One of the tongue and groove members 490, 492 arranged on a plurality of fingers 488 linked to one of the insert 470 and the retainer 480, the fingers 488 deflectable to allow the tongue and groove members 490, 492 to engage, the fingers 488 resiliently biased to a neutral position for retaining the tongue member 490 in the groove member 492.

Alternatively, one of the tongue and groove members 490, 492 may be arranged on a deformable portion, not shown, linked to one of the insert 470 and the retainer 480, the deformable portion elastically deformable to allow the tongue and groove members 490, 492 to engage.

Preferably, a leading edge of the tongue member 490 is configured to include a camming portion 491 to assist with the deflection of the fingers 488.

Preferably, the tongue and groove members 490, 492 are co-operable for a slidable engagement of the tongue member 490 along the groove member 492, and hence a relative sliding movement between the insert 470 and the retainer 480.

In accordance with yet another embodiment, not shown, the tongue and groove members 490, 492 are co-operable for generally preventing relative movement between the insert 470 and the retainer 480.

Preferably, the fingers 488, with the one of the tongue and groove members 490, 492 arranged thereon, are configured on the retainer 480. Alternatively, the fingers 488, with the one of the tongue and groove members 490, 492 arranged thereon, are configured on the insert 470. In accordance with yet another alternative, the fingers 488, with the one of the tongue and groove members 490, 492 arranged thereon, are configured on both the retainer 480 and the insert 470.

Preferably, the retainer 480 includes a pressure channel 454A extending therethrough for connecting a pressure channel 454B of the insert 470 with the pressure source 418.

Preferably, the retainer 480 includes a valve seat 432 configured adjacent a portal to the pressure channel 454A, the valve seat 432 configured to cooperate with the valve element 426.

Preferably, the retainer 480 includes a threaded seat 484 configured in the pressure channel 454A that is co-operable with a set screw, not shown, when it is desired to temporarily block the pressure channel 454A.

Preferably, the retainer 480 is co-operable with the insert 470 for trapping a resilient member 474 therebetween that forward-biases the insert 470 relative to the retainer 480. Advantageously, the resiliently-biasing the insert 470 maintains contact between the end portion of the molded article 2 and the insert as the molded article shrink fits into the cavity 452 with cooling. In particular, the resilient member 474 is preferably trapped between a flange 489, defined on the retainer body 481, and a circumferential step formed on an outside surface of the insert body 471.

Preferably, the retainer 480 includes a tool interface 486 for manipulating the connection between the tube 460 and the post-mold holding device 415.

Figure 11:
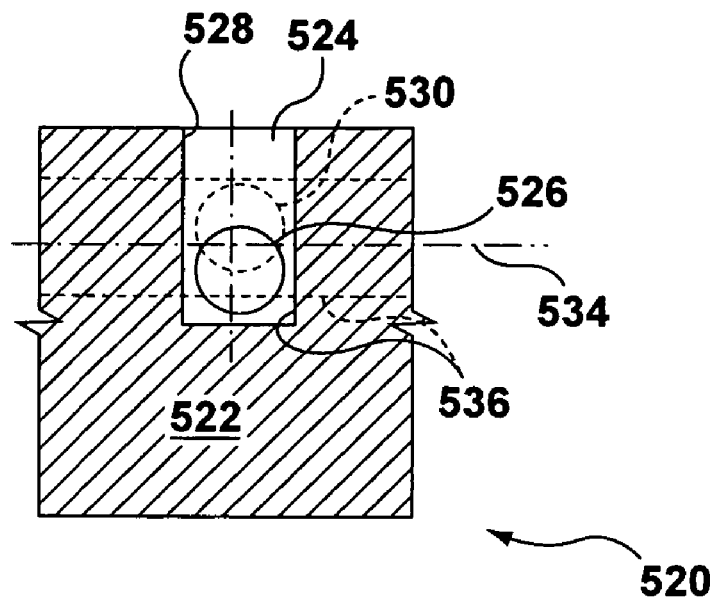
FIG. 11 is a section view of a valve in accordance with a third alternative embodiment of the present invention.

With reference to FIG. 11 a valve 520 in accordance with a third alternative embodiment of the present invention is depicted. The valve 520 is similar to the valve 220, described hereinbefore, with the plenum portal 530 being defined by overlap-connected sidewalls 536 of the valve chamber 524 and plenum 534. An exception to the foregoing is that the channels providing the valve chamber 524 and plenum 534 are generally perpendicular to each other.

Figure 12:
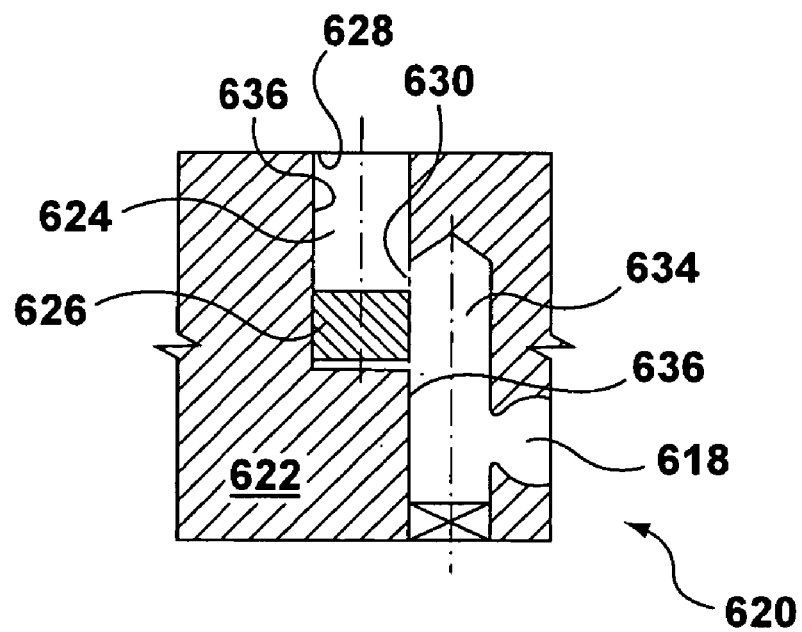
FIG. 12 is a section view of a valve in accordance with a fourth alternative embodiment of the present invention.

With reference to FIG. 12 a valve 620 in accordance with a fourth alternative embodiment of the present invention is depicted. The valve 620 is similar to the valve 220, described hereinbefore with the exception that the valve element 636 is a generally cylindrical member.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims:

What is claimed is:

1. A valve for controlling air flow in a molded article holder, the valve comprising:
a body defining a valve chamber for movably receiving a valve element, the valve chamber having a device portal and a plenum portal, the device portal being spaced apart from the plenum portal, in a direction of travel of the valve element;
the body defining a plenum, the plenum portal being defined by overlap-connected sidewalls of the valve chamber and plenum, the valve chamber being fluidly connected to the plenum through the plenum portal;
the plenum portal configured to be longer than the valve element, in the direction of travel of the valve element, and the plenum portal configured to retain the valve element in the valve chamber, at least in part.

2. The valve according to claim 1, wherein:
the plenum portal is at least twice as long the valve element, in the direction of travel of the valve element.

3. The valve according to claim 1, wherein:
with the valve element in an open position, a cross-sectional area of the plenum portal in front of the valve element is substantially the same, or greater, than a cross-sectional area of the device portal.

4. The valve according to claim 1, wherein:
in a blocking position the valve element sealingly co-operable with a valve seat that is defined on at least one of: the body; and the molded article holder.

5. The valve according to claim 1, wherein:
a cross-sectional area of the plenum and the valve chamber are substantially the same.

6. The valve according to claim 1, wherein:
the valve chamber and plenum are provided by substantially straight channels that are staggered, radially and longitudinally, and parallel.

7. The valve according to claim 6, wherein:
the plenum portal extends through the overlap-connected sidewall of the valve chamber, in the direction of travel of the valve element, from a base of the valve chamber to at least twice a length of the valve element.

8. The valve according to claim 7, wherein:
the valve element is arranged in the valve chamber such that a portion of the valve element projects into the plenum as the valve element moves between an open position and a blocking position.

9. The valve according to claim 1, wherein:
the device portal is configured for connection with a pressure channel of the molded article holder.

10. The valve according to claim 1, wherein:
the body further includes a coolant channel for connecting the molded article holder to a coolant source.

11. The valve according to claim 1, wherein:
the body is configured for interconnecting the holder with an post-mold holding device.

12. The valve according to claim 11, further including:
a valve cap co-operable with the body, the valve cap configured for interconnecting the holder with the body, the valve cap defining a valve seat for the valve element.

13. A molded article holder, comprising:
a body defining a cavity for receiving the molded article, a pressure channel in the body extending into the cavity for affecting a pressure induced mobility control of a molded article with respect to the cavity; and
a valve for controlling air flow in the pressure channel, the valve comprising:
a body defining a valve chamber for movably receiving a valve element, the valve chamber having a device portal, connectable to the pressure channel, and a plenum portal, the device portal being spaced apart from the plenum portal, in a direction of travel of the valve element;
the body defining a plenum, the plenum portal being defined by overlap-connected sidewalls of the valve chamber and plenum, the valve chamber being fluidly connected to the plenum through the plenum portal;
the plenum portal configured to be longer than the valve element, in the direction of travel of the valve element, and the plenum portal configured to retain the valve element in the valve chamber, at least in part.

14. The molded article holder according to claim 13, wherein:
the plenum portal is at least twice as long the valve element, in the direction of travel of the valve element.

15. The molded article holder according to claim 13, wherein:
with the valve element in the open position, a cross-sectional area of the plenum portal in front of the valve element is substantially the same, or greater, than a cross-sectional area of the device portal.

16. The molded article holder according to claim 13, wherein:
in a blocking position the valve element sealingly co-operable with a valve seat that is defined on at least one of: the body; and the molded article holder.

17. The molded article holder according to claim 13, wherein:
a cross-sectional area of the plenum and the valve chamber are substantially the same.

18. The molded article holder according to claim 13, wherein:
the valve chamber and plenum are provided by substantially straight channels that are staggered, radially and longitudinally, and parallel.

19. The molded article holder according to claim 18, wherein:
the plenum portal extends through the overlap-connected sidewall of the valve chamber, in the direction of travel of the valve element, from a base of the valve chamber to at least twice a length of the valve element.

20. The molded article holder according to claim 19, wherein:
the valve element is arranged in the valve chamber such that a portion of the valve element projects into the plenum as the valve element moves between an open position and a blocking position.

21. The molded article holder according to claim 13, wherein:
the device portal is configured for connection with the pressure channel of the molded article holder.

22. The molded article holder according to claim 13, wherein:
the body further includes a coolant channel for connecting the molded article holder to a coolant source.

23. The molded article holder according to claim 13, wherein:
the body is configured for interconnecting the molded article holder with an post-mold holding device.

24. The molded article holder according to claim 23, further including:
a valve cap co-operable with the body, the valve cap configured for interconnecting the holder with the body, the valve cap defining a valve seat for the valve element.

25. A post-mold holding device, comprising:
a molded article holder, comprising:
a body defining a cavity for receiving the molded article, a pressure channel in the body extending into the cavity for affecting a pressure induced mobility control of the molded article with respect to the cavity; and
a valve for controlling air flow in the pressure channel, the valve comprising:
a body defining a valve chamber for movably receiving a valve element the valve chamber having a device portal, connectable to the pressure channel, and a plenum portal, the device portal being spaced apart from the plenum portal, in a direction of travel of the valve element;
the body defining a plenum, the plenum portal being defined by overlap-connected sidewalls of the valve chamber and plenum, the valve chamber being fluidly connected to the plenum through the plenum portal;
the plenum portal configured to be longer than the valve element, in the direction of travel of the valve element, and the plenum portal configured to retain the valve element in the valve chamber, at least in part.

26. The post-mold holding device according to claim 25, wherein:
the plenum portal is at least twice as long the valve element, in the direction of travel of the valve element.

27. The post-mold holding device according to claim 25, wherein:
with the valve element in the open position, a cross-sectional area of the plenum portal in front of the valve element is substantially the same, or greater, than a cross-sectional area of the device portal.

28. The post-mold holding device according to claim 25, wherein:
in a blocking position the valve element sealingly co-operable with a valve seat that is defined on at least one of: the body; and the molded article holder.

29. The post-mold holding device according to claim 25, wherein:
a cross-sectional area of the plenum and the valve chamber are substantially the same.

30. The post-mold holding device according to claim 25, wherein:
the valve chamber and plenum are provided by substantially straight channels that are staggered, radially and longitudinally, and parallel.

31. The post-mold holding device according to claim 30, wherein:
the plenum portal extends through the overlap-connected sidewall of the valve chamber, in the direction of travel of the valve element from a base of the valve chamber to at least twice a length of the valve element.

32. The post-mold holding device according to claim 31, wherein:
the valve element is arranged in the valve chamber such that a portion of the valve element projects into the plenum as the valve element moves between an open position and a blocking position.

33. The post-mold holding device according to claim 25, wherein:
the device portal is configured for connection with the pressure channel of the molded article holder.

34. The post-mold holding device according to claim 25, wherein:
the body further includes a coolant channel for connecting the molded holder to a coolant source.

35. The post-mold holding device according to claim 25, wherein:
the body is configured for interconnecting the molded article holder with an post-mold holding device.

36. The post-mold holding device according to claim 35, further including:
a valve cap co-operable with the body, the valve cap configured for interconnecting the molded article holder with the body, the valve cap defining a valve seat for the valve element.

37. The post-mold holding device according to claim 25, wherein:
the post-mold holding device is an end-of-arm-tool.

* * * * *